(12) United States Patent
Gibson (10) Patent No.: US 6,959,655 B1
(45) Date of Patent: Nov. 1, 2005

(54) METHOD AND APPARATUS FOR THE APPLICATION OF FLUID TO SOIL OR PLANTS

(76) Inventor: Leslie R. Gibson, P.O. Box 216, Jarales, NM (US) 87023

( * ) Notice: Subject to any disclaimer, the term of this patent is extended or adjusted under 35 U.S.C. 154(b) by 0 days.

(21) Appl. No.: 10/216,460

(22) Filed: Aug. 9, 2002

Related U.S. Application Data (60) Provisional application No. 60/311,676, filed on Aug. 9, 2001.

(51) Int. Cl.⁷ ............................................. A01C 23/00
(52) U.S. Cl. ..................................................... 111/118
(58) Field of Search ........................ 111/123, 124, 125, 111/118, 119, 200

(56) References Cited

U.S. PATENT DOCUMENTS

| | | | |
|---|---|---|---|
| 242,862 A * | 6/1881 | Bartholomew et al. ..... | 111/150 |
| 1,564,083 A * | 12/1925 | Lyons ......................... | 111/150 |
| 2,306,339 A * | 12/1942 | Leavitt .................... | 47/58.1 R |
| 2,646,012 A * | 7/1953 | Ingalls ........................ | 111/124 |
| 2,781,733 A * | 2/1957 | Grahm ........................ | 111/123 |
| 2,842,077 A * | 7/1958 | Morrison .................... | 111/124 |
| 2,849,970 A * | 9/1958 | Coberly et al. ............. | 111/119 |
| 3,188,989 A * | 6/1965 | Johnston ..................... | 111/123 |
| 3,398,542 A | 8/1968 | Hansen et al. | |
| 3,581,685 A | 6/1971 | Taylor | |
| 3,590,588 A | 7/1971 | Draper et al. | |
| 3,863,842 A * | 2/1975 | McFarland et al. ......... | 239/283 |
| 3,895,589 A * | 7/1975 | Garner et al. ............... | 111/186 |
| 4,079,680 A * | 3/1978 | Davis .......................... | 111/124 |
| 4,129,082 A * | 12/1978 | Betulius ..................... | 111/123 |
| 4,683,826 A | 8/1987 | Solie et al. | |
| 4,825,959 A | 5/1989 | Wilhelm | |
| 5,033,398 A * | 7/1991 | Froc ........................... | 111/152 |
| 5,240,080 A | 8/1993 | Bassett et al. | |
| 5,558,471 A | 9/1996 | Payne | |
| 5,727,484 A | 3/1998 | Childs | |
| 5,865,131 A * | 2/1999 | Dietrich et al. ............. | 111/121 |
| 5,996,514 A | 12/1999 | Arriola et al. | |
| 6,167,821 B1 | 1/2001 | Beggs | |
| 6,276,463 B1 | 8/2001 | Hollimon et al. | |

OTHER PUBLICATIONS

Advertisement for Rockland Clearing Equipment by Rockland Manufacturing, source and date unknown (disclosed to attorney of record on Jul. 17, 2001).

* cited by examiner

*Primary Examiner*—Victor Batson
(74) *Attorney, Agent, or Firm*—Deborah A. Peacock; Vidal A. Oaxaca; Peacock Myers, P.C.

(57) ABSTRACT

The present invention is a method and apparatus for the application of fluid to soil and/or plants. A cutting blade for the soil preferably goes to depths of at least 12 inches. A nozzle/spray system is provided to the cutting blade to provide fluid during cutting of the soil. The nozzle may be protected by a shield, or recessed into the blade for protection. The primary application is the eradication of dense tree and brush species, by cutting the soil and applying an herbicide below the root crown level, in a single step.

11 Claims, 11 Drawing Sheets

METHOD AND APPARATUS FOR THE APPLICATION OF FLUID TO SOIL OR PLANTS

CROSS-REFERENCE TO RELATED APPLICATIONS

This application claims the benefit of the filing of U.S. Provisional Patent Application Ser. No. 60/311,676, entitled "Method and Apparatus for the Eradication of Plants," filed on Aug. 9, 2001, and the specification thereof is incorporated herein by reference.

BACKGROUND OF THE INVENTION

1. Field of the Invention (Technical Field)

The present invention relates to the field of plant removal and eradication, particularly with regard to removing the roots of plants. The present invention is an apparatus and method for the application below ground of fluids to plants and/or soil, in particular for applying pesticides and fungicides to roots being severed during the process of root plowing. This technology is useful on virtually any blade that is being drawn through the soil.

2. Background Art

Note that the following discussion refers to a number of publications by author(s) and year of publication, and that due to recent publication dates certain publications are not to be considered as prior art vis-à-vis the present invention. Discussion of such publications herein is given for more complete background and is not to be construed as an admission that such publications are prior art for patentability determination purposes.

There is an immediate need for a process to eradicate non-native dense tree and brush species from ecosystems, primarily riparian ecosystems. These non-native species are often able to out-compete native species of plants and trees. The non-native species usually consume more water, lowering the level of the lake or river and further damaging the entire ecosystem.

Once established, many dense tree and brush species are extremely difficult, if not impossible, to eradicate. There deep root zones and ability to quickly re-grow from roots renders cutting and shallow root plow methods ineffective. While different methods have been developed to control these species, none is entirely satisfactory.

The current process to remove Salt Cedar (Tamerix), for example, is:

1) Use a non-selective herbicide on the canopy applied by aircraft on larger, monolithic stands (arsenal and roundup combination);
2) Let it stand for up to two years for the herbicides to take effect, which usually results in about a 90% kill;
3) Utilizing heavy equipment, stack and burn dead material;
4) Root plow area being treated;
5) Root rake;
6) Stack and burn for the second time;
7) Retreat sprouts that were missed with the herbicide and mechanical treatment (the result at this point is an area in which about 98% of all vegetation has been eradicated); and
8) Revegetate area (pole plantings and seedings) back to native vegetation.

This process is costly, takes an inordinate amount of time, and is not completely effective. Also, since the herbicide is applied non-selectively from the air, large amounts must be used, increasing the cost and the potential for harm to native plants, animals, and even human populations.

While prior methods have been developed to place fluids and gases below ground level, no method currently in use is able to operate at great depths and apply herbicide directly to severed roots. The following is a discussion of several background patents.

U.S. Pat. No. 5,996,514, entitled "Apparatus and Method for Subsurface Application," issued Dec. 7, 1999, to Arriola et al, describes a method of applying fluids to soil at depths of up to 12 inches. A plurality of shanks dig trenches in the soil, and a nozzle behind each shank delivers fluid into the trench. U.S. Pat. No. 5,558,471, entitled "Device for Injecting Chemicals into the Soil," issued on Sep. 24, 1996, to Payne, describes a device that also sprays fluid into trenches at shallow depths, but uses discs and knives to cut the trenches. A belt keeps vegetation on the soil. While the Arriola and Payne inventions are useful for shallow application, they do not have the ability to effectively sever deep roots, or apply fluid to those roots.

U.S. Pat. No. 5,240,080, entitled "Adjustable Attachment for Mounting a Farming Tool on a Drawing Vehicle," issued Aug. 31, 1993, to Bassett, et al, describes an apparatus for mounting a subsurface plow to a towing vehicle. An apparatus for placing fertilizer into the soil is also described, but it only operates at shallow depths.

U.S. Pat. No. 3,581,685, entitled "Device for Distributing Chemicals Beneath the Soil Surface and Conditioning Seed Beds," issued Jun. 1, 1971, to Taylor, describes a subsurface plow with nozzles for fluid delivery. Dirt mover wings are included to remove soil from above the plow, so this device operates on the surface or at very shallow depths.

U.S. Pat. No. 6,167,821, entitled "Method and Apparatus for Fumigating Soil," issued to Beggs Jan. 2, 2001, describes an apparatus for injecting gasses two to twelve inches into the soil. The apparatus digs trenches in the soil, injects the fumigant, and then seals the trenches and packs the soil to prevent escape of the fumigant.

U.S. Pat. No. 3,590,588, entitled "Process and Apparatus for Laying a Subterranean Film," issued Jul. 6, 1971, to Draper et al, describes an apparatus for placing a sheet of plastic horizontally one to four feet below ground level. The sheet is drawn through the apparatus and then unfolded below ground level by the apparatus. Nozzles may be used to apply fluid to the sheet as it leaves the apparatus, but not to the soil itself.

U.S. Pat. No. 3,398,542, entitled "Subterranean Plow," issued Aug. 27, 1968, to Hansen et al, describes an apparatus for placing an asphalt membrane below ground level. As the plow is drawn through the soil, asphalt is injected into a cavity formed by the plow.

U.S. Pat. No. 4,825,959, entitled "Fertilizer System," issued May 2, 1989, to Wilhelm, describes a fertilizer distribution apparatus for use with a subterranean plow. Fertilizer distribution pipes are enclosed within a channel for protection, but are not integrated into the cutting blade.

U.S. Pat. No. 4,683,826, entitled "Subsurface Application of Chemicals," issued Aug. 4, 1987, to Solie, et al, describes an apparatus and a method for applying chemicals to soil at depths of up to eight centimeters. A system of upwardly-pointing nozzles and supply manifolds is attached to the rearward edge of a subterranean plow, so that chemicals are applied to soil after it passes over the plow. Because this invention operates at shallow depths, it cannot apply fluids to deep root zones.

U.S. Pat. No. 6,276,463, entitled "Compacted Soil and Rock Raising Blade," issued Aug. 21, 2001, to Hollimon, et al, describes a subsurface plow able to operate at depths greater than one foot, but the plow lacks a means to deliver fluids to the soil.

In summary, the prior art includes subsurface plows that apply fluids into the soil; however, they are designed to operate at or very close to the surface, with their primary application being the removal of weeds from agricultural land. Prior art methods are inadequate for the eradication of thick tree and brush species, which have root zones that are much deeper than the weeds that these devices were designed to eradicate.

What is needed is an apparatus that can sever thick roots deep below ground, and then apply herbicide selectively below ground to destroy any remaining roots all the while keeping the spray nozzles protected. Utilization of the method and apparatus of the present invention accomplishes this and provides a simple, effective, and inexpensive process.

SUMMARY OF THE INVENTION
(DISCLOSURE OF THE INVENTION)

The present invention is an apparatus and method for applying fluids to plants and/or soil.

In one embodiment, the apparatus comprises: a blade member capable of cutting through soil to a depth of at least 12 to 18 inches (or even several feet); at least one nozzle; a fluid supply source; and a line connecting the fluid supply source to the nozzle.

In an alternative embodiment, the nozzle(s) are disposed within the blade member. The nozzle releases the fluid during operation of the blade member.

In another embodiment, at least one nozzle is disposed in a forward direction of the cutting edge of the blade member.

For eradication of plants, the depth should be below the roof crown and an herbicide is used as the fluid.

The nozzle may be disposed within the blade member. The nozzle may be disposed in a forward direction of the blade direction of travel, or in a rearward direction of the blade direction of travel. At least one shield is preferably disposed near the nozzle for protecting the nozzle. A sensor and control system may also be provided. The blade member preferably comprises a groove with a plurality of nozzles, and the nozzles are recessed within the blade member.

The present invention comprises an apparatus and method for the application of herbicides to roots being severed during the process of conventional root plowing. This technology is useful on virtually any blade that is being drawn through the soil.

A primary object of the present invention is the placement of fluids below ground level;
    A further object is the application of herbicides and fungicides to specific root zones below ground level;
    Another object of the present invention is to apply herbicides and fungicides below ground level that is covered with water; and
    A further object of the present invention is to narrow the effect of non-selective herbicides by placing the herbicides below shallow root-zoned plants.

The primary advantages of the present invention are effectiveness and efficiency; and
    A secondary advantage of the present invention is increased safety.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED
EMBODIMENTS (BEST MODES FOR
CARRYING OUT THE INVENTION)

The present invention provides a method and apparatus for applying fluid to plants and/or soil.

Figure 1A:
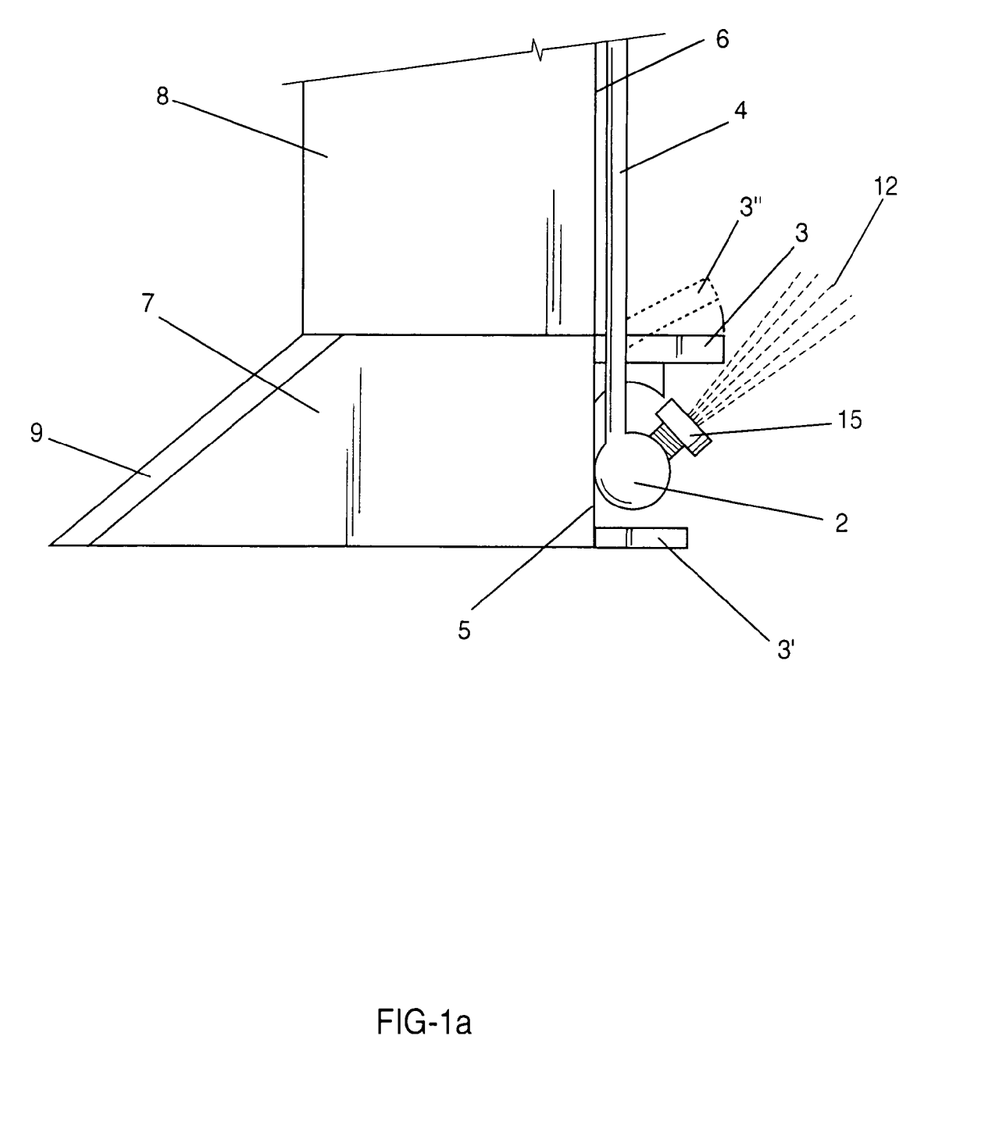
FIGS. 1a and b are views of a preferred embodiment of the present invention, wherein fluid supply tubes and nozzles are attached to the rear of a blade.
Figure 1B:
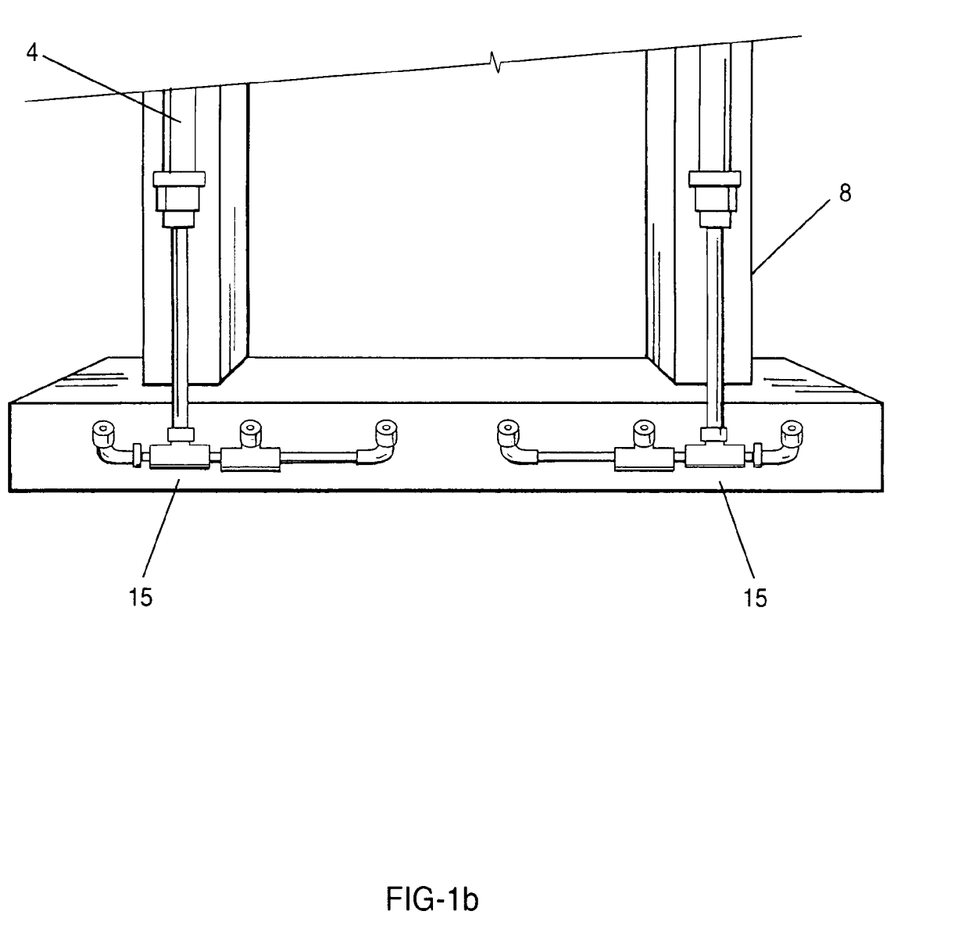

FIGS. 1a and b illustrate a preferred embodiment of the present invention, which may be retrofitted to existing cutting blades. Pressurized spray bar 2, supply lines 4, and one or more nozzle assemblies 15 are attached to heel 5 of cutting blade 7 with hardened cutting edge 9. In this embodiment, spray nozzle assembly 15 directs spray to the rear direction of travel of blade 7.

As shown in FIG. 1a, nozzle assembly 15 preferably comprises a nozzle delivering spray for fluids. Nozzle assembly 15 is preferably made of brass or stainless steel although other materials, such as other metals or alloys, plastics, or ceramics could be used depending on the application. Nozzle assembly 15 preferably comprises a low-profile nozzle delivering spray patterns 12 of tapered flat, even flat, wide flat cone, hollow cone, off-centered flat, and/or full cone patterns, or other patterns, depending on the application. Nozzles 15 are preferably high pressure nozzles.

Pressurized spray bar 2 preferably comprises a round, rectangular, or square tube supplying pressurized liquid from a pump system to nozzle assemblies 15. Spray bar shields 3, 3' prevent material passing over or under the cutting blade 7 from hitting or interfering with spray bar 2 or nozzle spray pattern 12 and protects nozzle assembly 15. Shields 3, 3' may be horizontal or any angle 3" (see dashed lines). Fluid flows to nozzle assembly 15 through supply line 4. Supply line is either inlaid in shank 8 or attached on the outside rear of shank. Heel 5 of cutting blade 7 is the rear of cutting edge bar 7 as it moves through the soil. Heel 6 of shank 8 is the rear of shank 8 as it moves through the soil. V-shaped cutting blade 7 can be manufactured to fit the contours of ditches and side slopes, or it may be a straight, conventional blade. Shank 8 comprises bars leading from the surface apparatus (e.g., a plow) to cutting blade 7, maintaining it at a desired depth while pulling it forward during application.

FIG. 1b shows a rear view with multiple nozzles 15, supply lines 4 and shields 3, 3'. Nozzles 15 are shown at the rear of the implement, pointing upward. As can be seen, the entire spray system of the invention can be added on or retrofitted (e.g. as a panel) to an existing implement. Alternatively, the implement can be manufactured with the nozzle and spray system in mind.

As cutting blade 7 moves through the soil, soil passes over the top surface and under the bottom surface of cutting blade 7. Nozzle assemblies 15 apply fluid under pressure to the soil after the soil has passed over and under the cutting blade 7. Nozzle assemblies 15 may be directed upward 12 as shown, or may be directed downward or sideways. Nozzle assemblies 15 may also be directed alternately upward and downward and/or sideways to provide a wider zone of fluid dispersion. Spray bar shields 3, 3' protect fluid supply lines 4 and nozzle assemblies 15 from the abrasion of roots, soil, and rocks, and allow spray pattern 12 to reach maximum width before spray contacts the soil. For plant eradication, prior to the chemical application, it is preferable to remove the above-ground canopy (dense vegetation on surface). The vegetation is then stacked and burned. Using the blade and spray of the present invention, one can treat and eradicate root systems left intact underground. This is done at a depth that allows shallow-rooted native plants (grasses and small forbs) to survive the process. Because fluid herbicide in a preferred application is applied directly to the plants' roots and the soil in the root zone, the herbicide is especially effective.

Figure 2A:
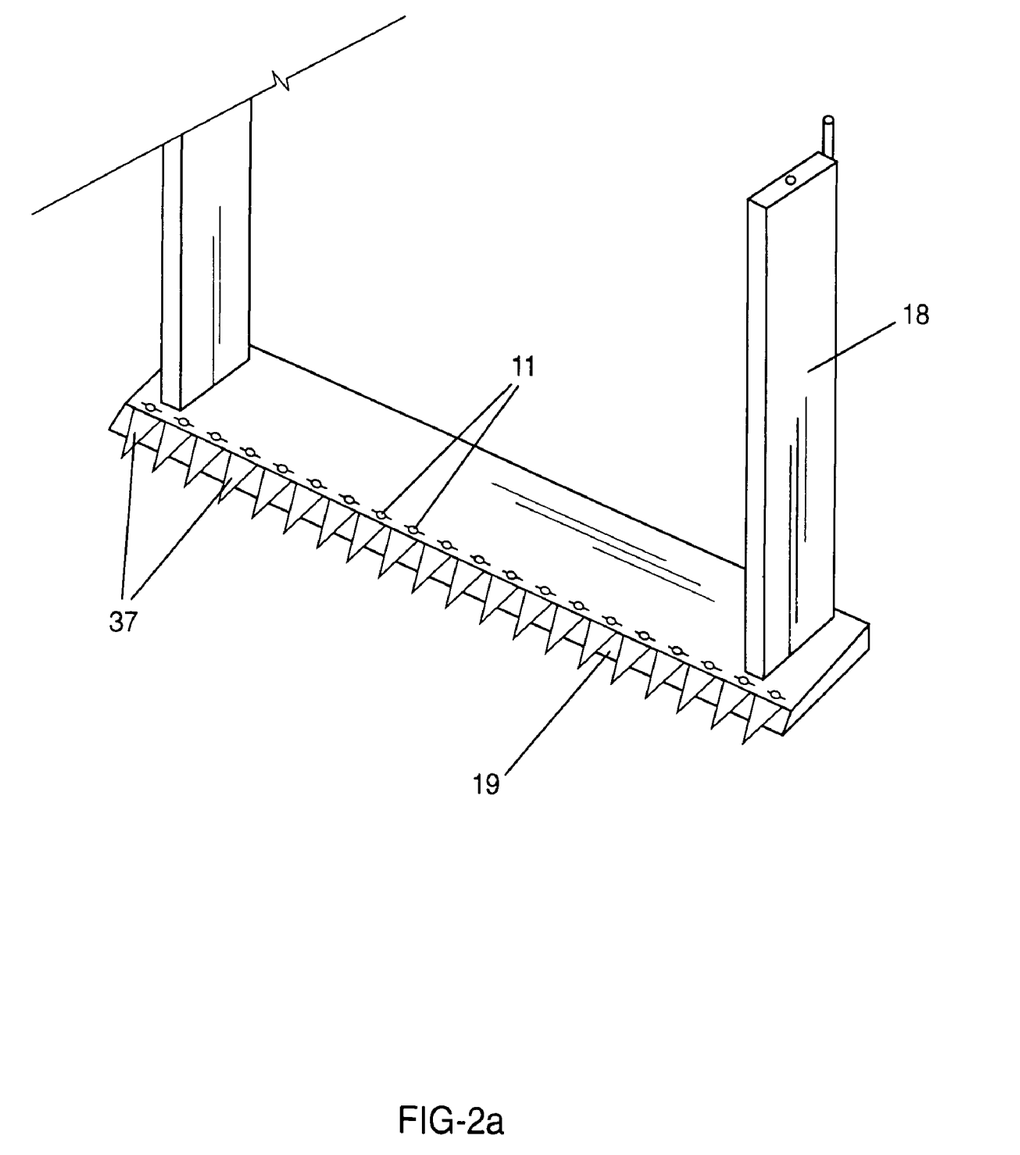
FIGS. 2a and b show an alternative embodiment of the present invention, wherein the fluid supply lines and nozzles are recessed into a blade.
Figure 2B:
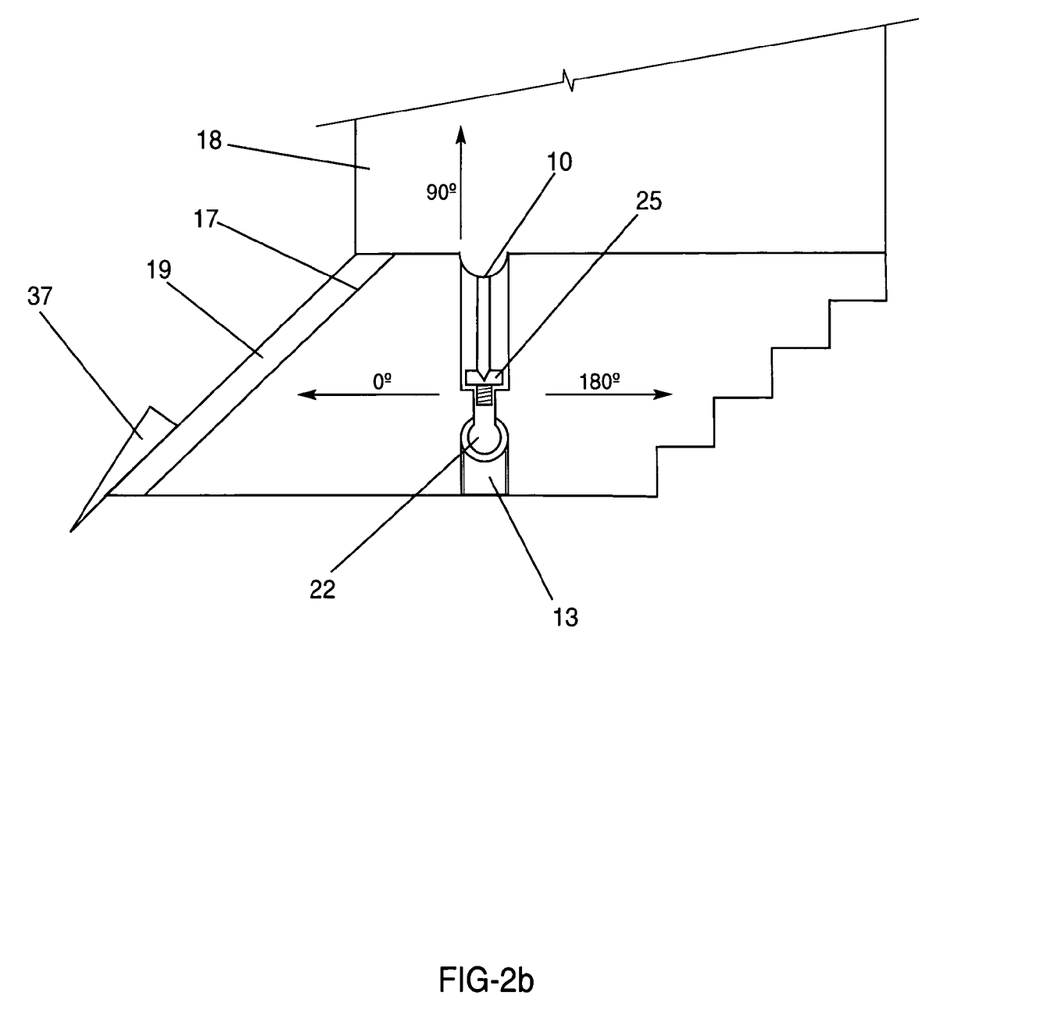
Figure 3:
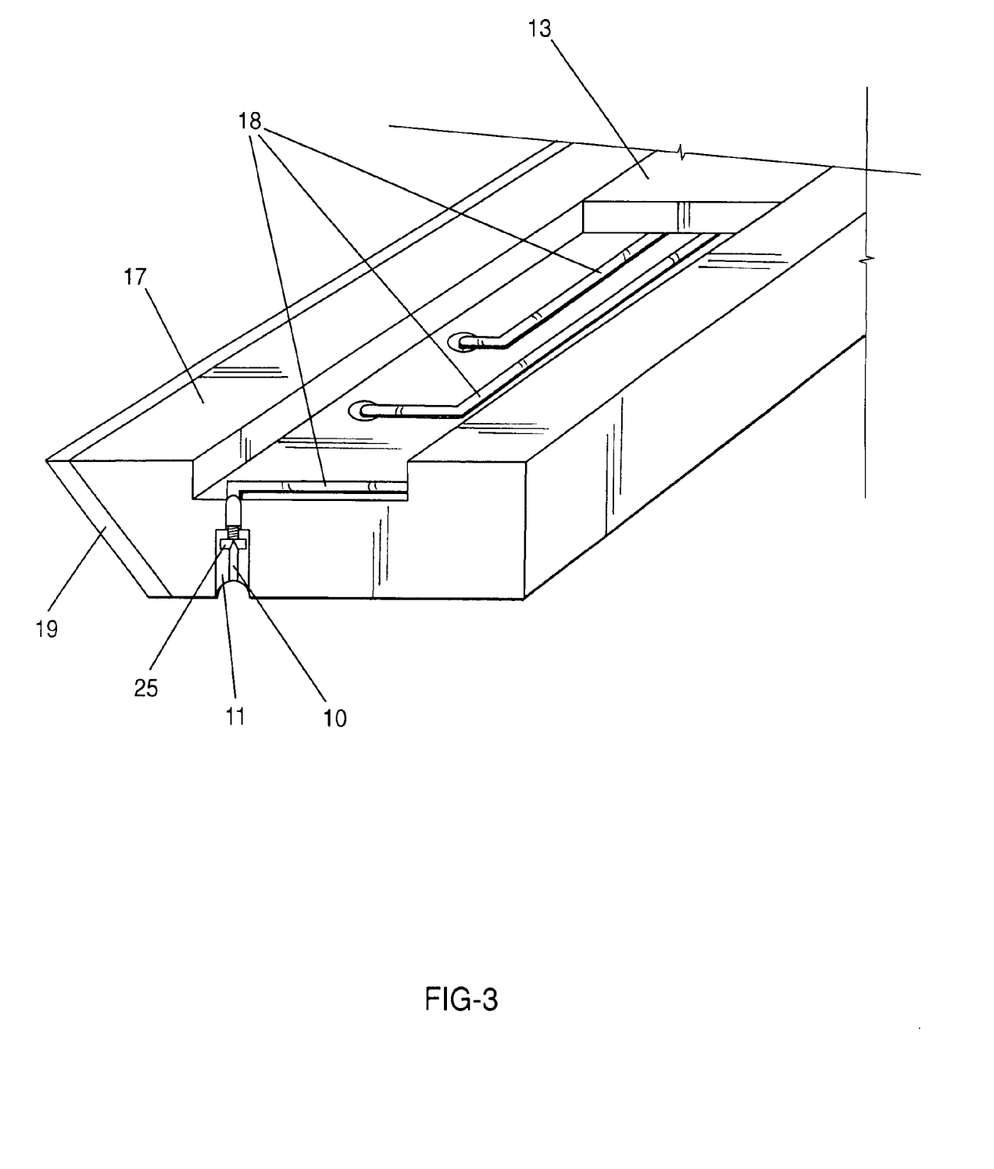
FIG. 3 is a perspective bottom cross sectional view of the FIG. 2 embodiment, showing fluid supply tubes, nozzles, and a shield for supply tubes.

FIGS. 2a and b and FIG. 3 depict an alternative embodiment in which the fluid delivery system is integrated into cutting blade 17. Recessed nozzle area 11 is an area that is machined out or drilled to recess nozzle assembly 25 below the surface of cutting blade 17. Spray channel 10 forms an area from nozzle assembly 25 (the point the spray leaves the recessed nozzle) to the surface of cutting blade 17. Hardened cutting edge 19 is preferably hardened steel attached to and protecting the leading edge of cutting blade 17 and areas of shanks 18 that operate below the soil. Stainless steel or synthetic tube 22, material tank, plumbing, valves, and nozzles are preferably made of a material that will not corrode or flake and that will preferably withstand 0 to 2000 psi. Welded or bolted block shields 13 are preferably plates of steel, which shield the plumbing inlaid into cutting blade 17 and shanks 18.

During manufacturing, recessed nozzle areas 11 are directed either upward at 90 degrees as depicted in FIG. 2b or may be directed forward at varying angles as depicted in FIG. 2a so that nozzles 25 place fluid forward of cutting blade 17.

Optional chisel points 37, attached to cutting blade 17, are particularly useful for fracturing soil prior to contact with cutting blade 17.

Nozzle sprays may also be directed downward or rearward at varying angles. Each of these embodiments has its advantages. The advantage of applying fluid in front of the cutting blade is that it is mixed more thoroughly with the soil as the soil passes over and then behind the blade. Upward and downward facing nozzles apply fluid directly to the soil and exposed roots as the blade passes through the soil and shears the roots. Rearward facing nozzles are more protected and spray fluid into the temporary airspace created by the passage of the cutting blade, allowing for wider dispersion of the fluid. The cutting blade may be manufactured according to one of these embodiments, or may incorporate a combination of some or all of forward, upward, downward, rearward or even sideways facing nozzles.

FIG. 3 depicts a bottom cross-sectional view of the FIG. 2 embodiment showing inlaid lines 18 connecting a pump system to nozzle assemblies 25. Supply line shield 13 covers and protects inlaid supply lines 18. Supply lines 18 run from the pump to each nozzle 25 individually, allowing for individual or zone control of nozzle 15.

A control system may vary fluid flow to individual nozzles, or may be used to turn individual nozzles on and off. Alternatively, individual control of the nozzles may be used in conjunction with a separate material tank to apply a second type of fluid that cannot be mixed with the first in the tank. For example, two types of herbicides, or a selective herbicide to kill the sheared roots of unwanted plants and a fertilizer sprayed through upwardly pointing nozzles to encourage the growth of other plants, may be simultaneously applied by different nozzles or zones of nozzles.

Figure 4A:
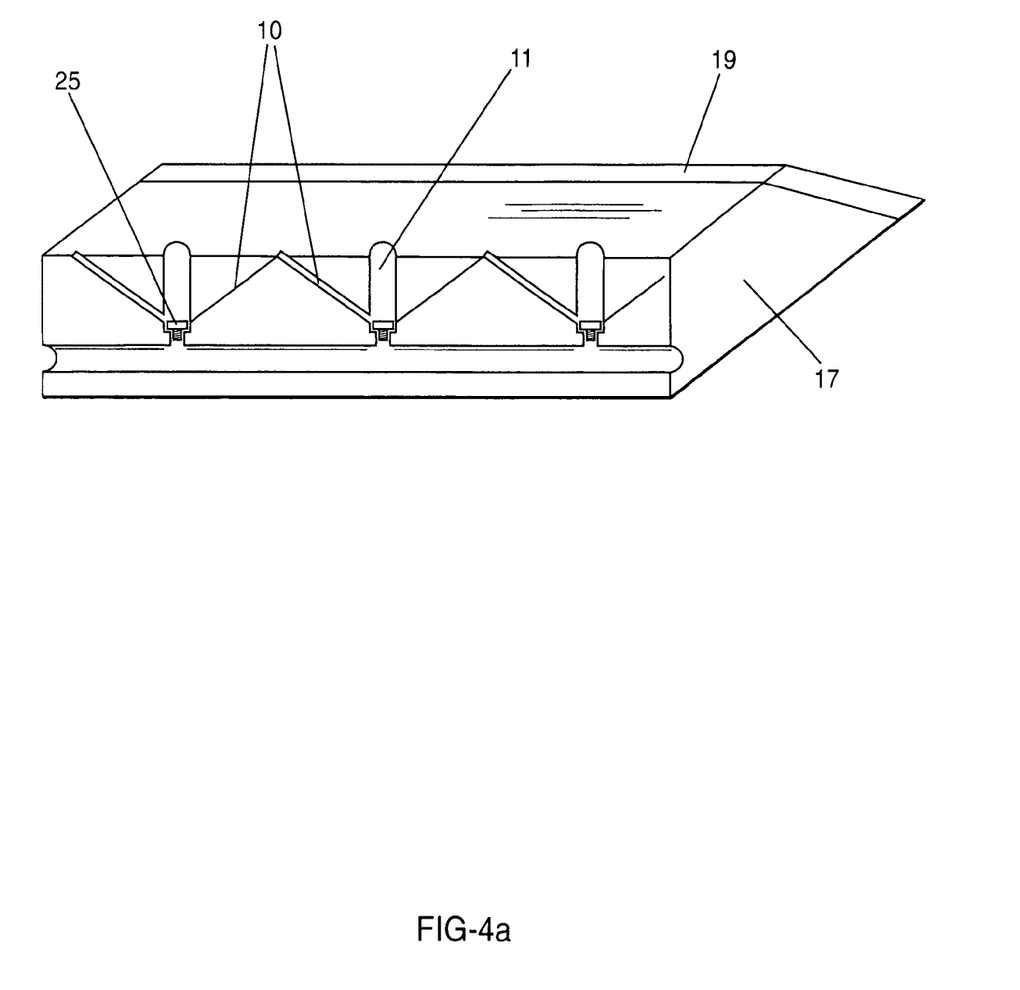
FIGS. 4a and b are views of the rear and top of the blade of FIG. 2 showing nozzles and spray channels.
Figure 4B:
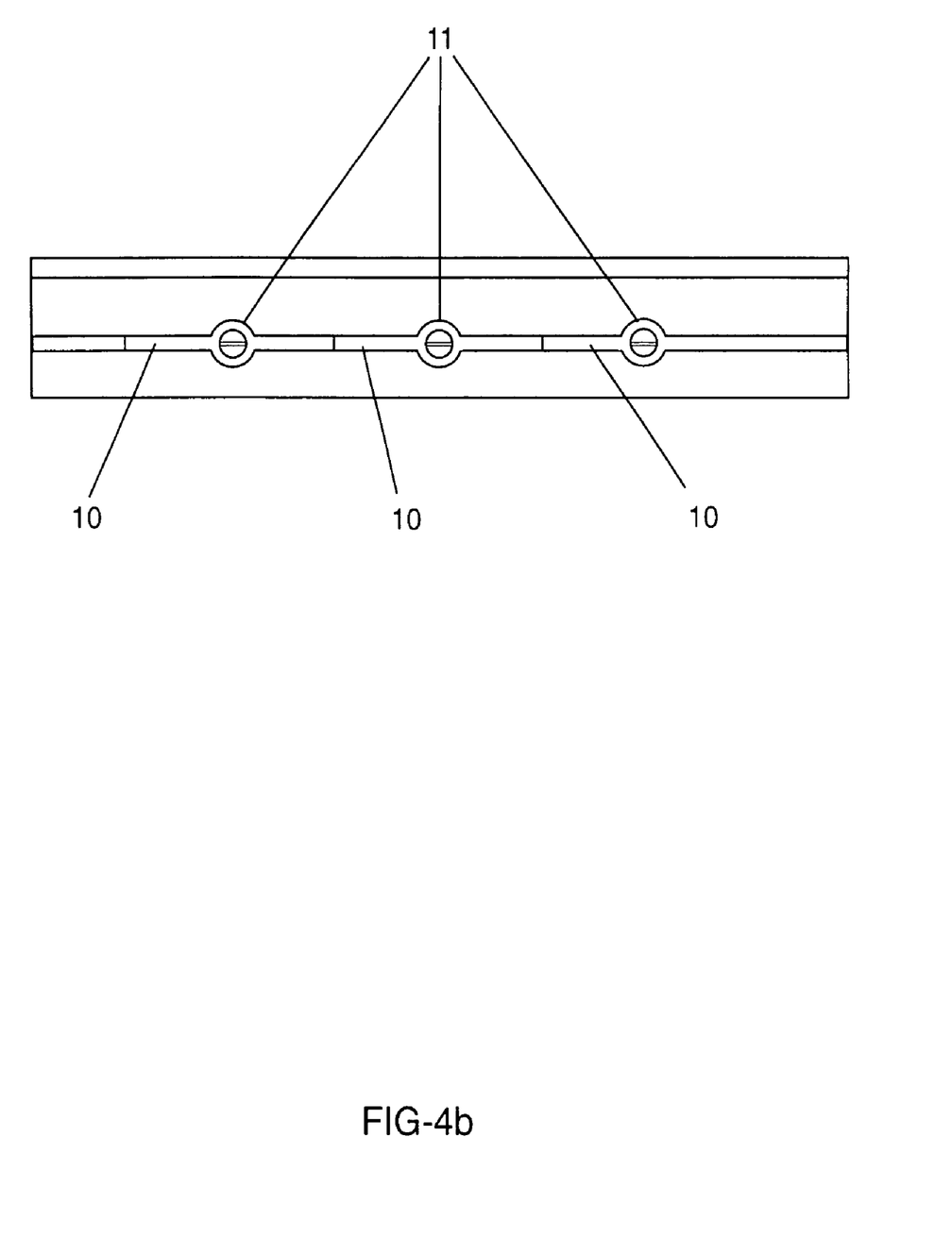

FIGS. 4a and b depict a rear cross-sectional view and top view of the FIG. 2 embodiment of cutting blade 17 showing nozzle assemblies 25, recessed nozzle areas 11, and spray channels 10. Spray channels 10 are preferably angled to be widest at the surface of cutting blade 17 to allow the spray pattern to acquire its full width at the surface of the cutting blade. As the soil in contact with the surface of the cutting blade passes spray channels 10, fluid is evenly applied.

One beneficial aspect of the present invention is that spray channels and spray bar shields maintain an airspace between the nozzles and the soil, so that the fluid spray is able to spread out before contacting the soil. The result is even application of the fluid, unlike may prior art devices which tend to leave "lines" of fluid as they are drawn through the soil.

Figure 5:
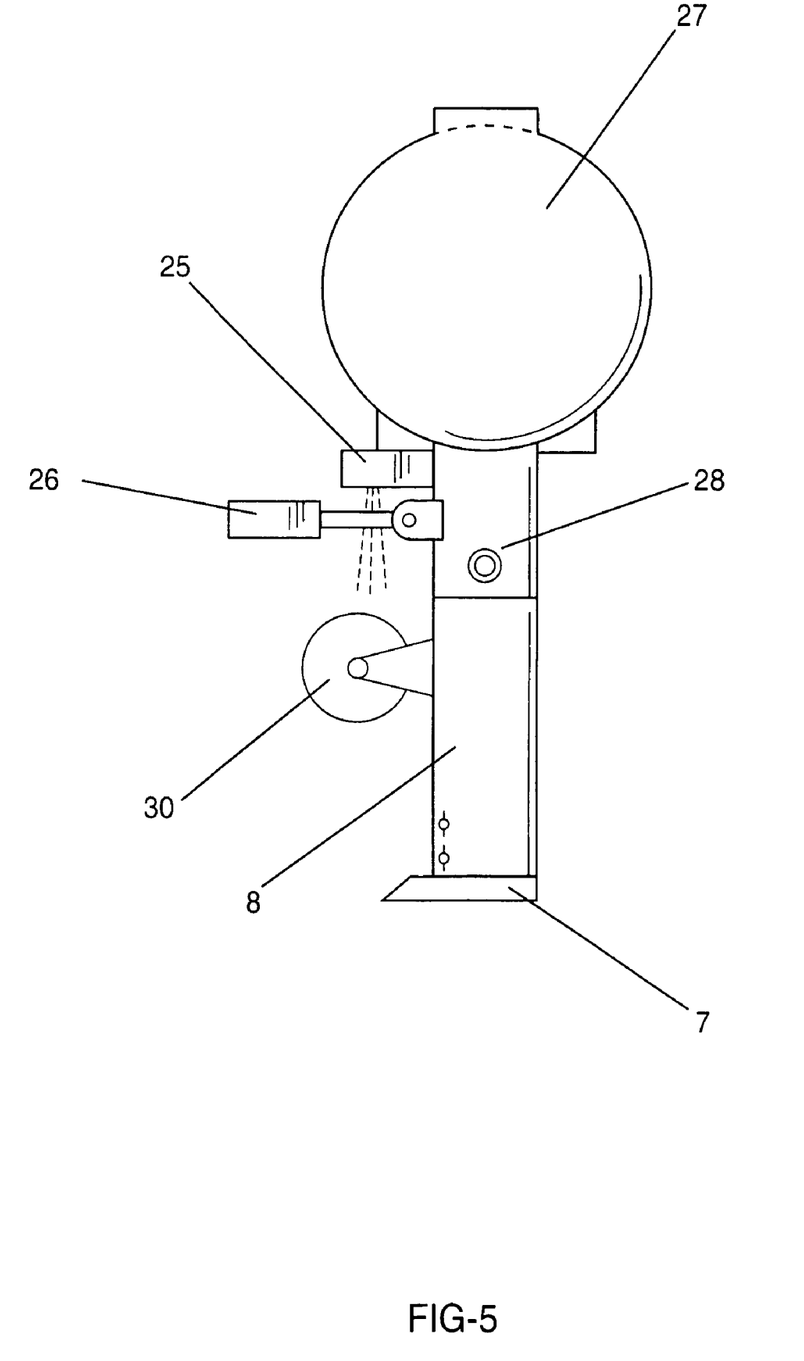
FIG. 5 is a side view of an alternative embodiment of the present invention, depicting a material supply tank, high-pressure pump, hydraulic system, and mounting to a tractor.

FIG. 5 depicts a side view of an alternative embodiment showing control systems. Cutting blade 7 and shank 8 are shown for reference. Monitor 25 monitors any or all of the following: depth of blade, vegetation material approaching cutting blade, water table depth, moisture content of soil at blade depth, volume of chemical being supplied to each nozzle or zone, and speed of travel. Hydraulics 26 provide for blade control (e.g., pivot option). Hydraulic control allows cutting blade 7 and shanks 8 to rotate about pivot 28 allowing easier entry to soil to a desired depth, then allowing correction of the angle to be drawn through the soil. Material tank 27 is a reservoir for liquid and herbicide to supply pressure system 32 delivering product to nozzle assembly 15. Material tank may be mounted on an implement or on a power source pulling implement (e.g., tractor). Heavy-duty coulter 30, also known as a pavement cutter in the commercial construction equipment industry, is similar to a heavy-duty pizza cutter that can withstand 50,000 pounds of downward pressure. Heavy-duty coulters run ahead of shanks 8, cutting the debris that would collect on shanks 8 and starting the initial opening ahead of shanks 8. Connection 31 to equipment may be an implement that is manufactured for installation on 3-point tool bars connected to agricultural tractors, tracked tractors (bulldozers), rubber tracked-type dozers, backhoes, and excavators. A pressure system comprises pump 32 capable of delivering 5 to 2,000 psi at nozzle assemblies. The pressure system may be powered by "Power Take Off" between hydraulics, gas or diesel engine, or electrically.

Figure 6A:
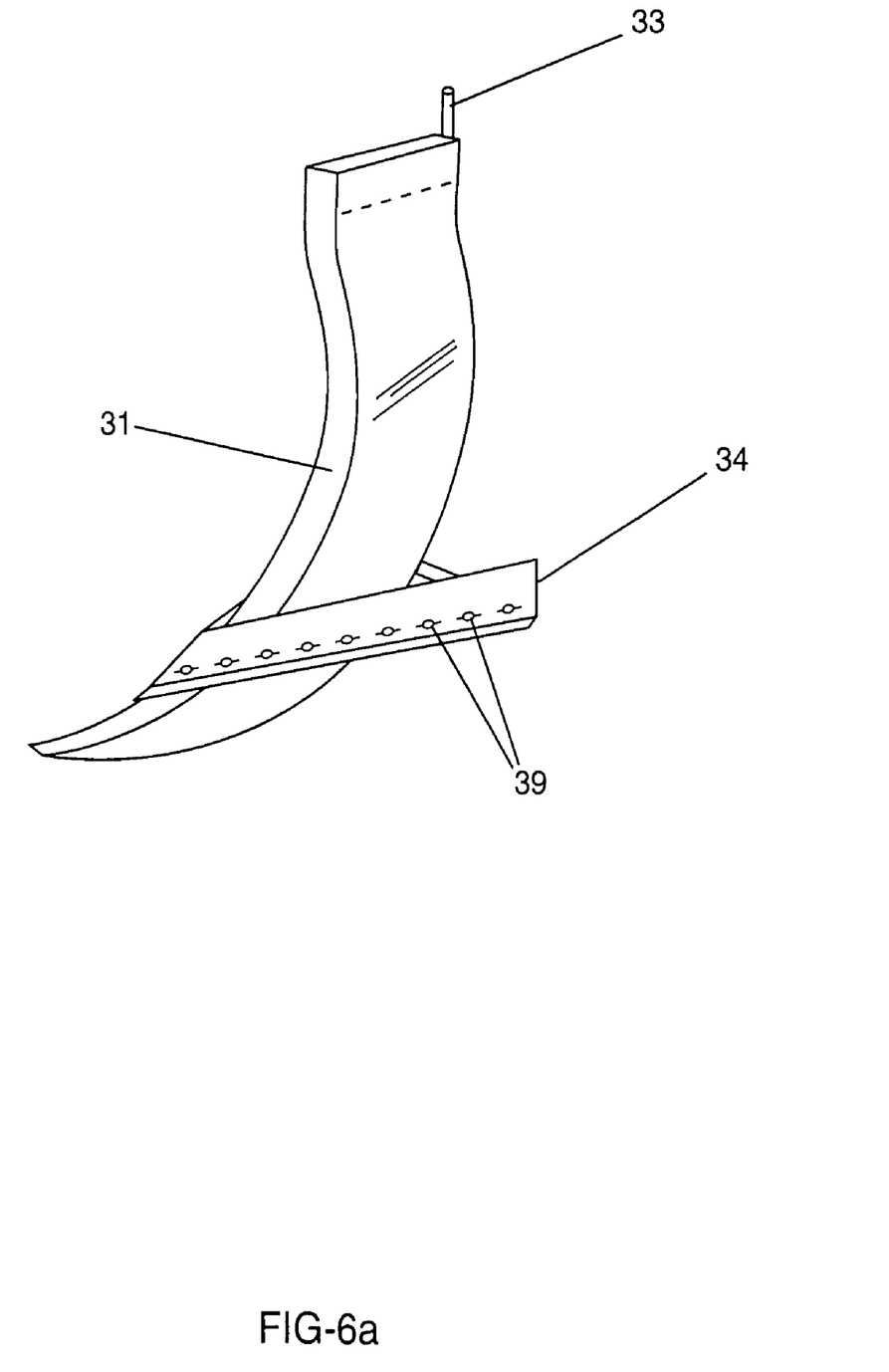
FIGS. 6a–c show different types of shanks useful with the present invention.
Figure 6B:
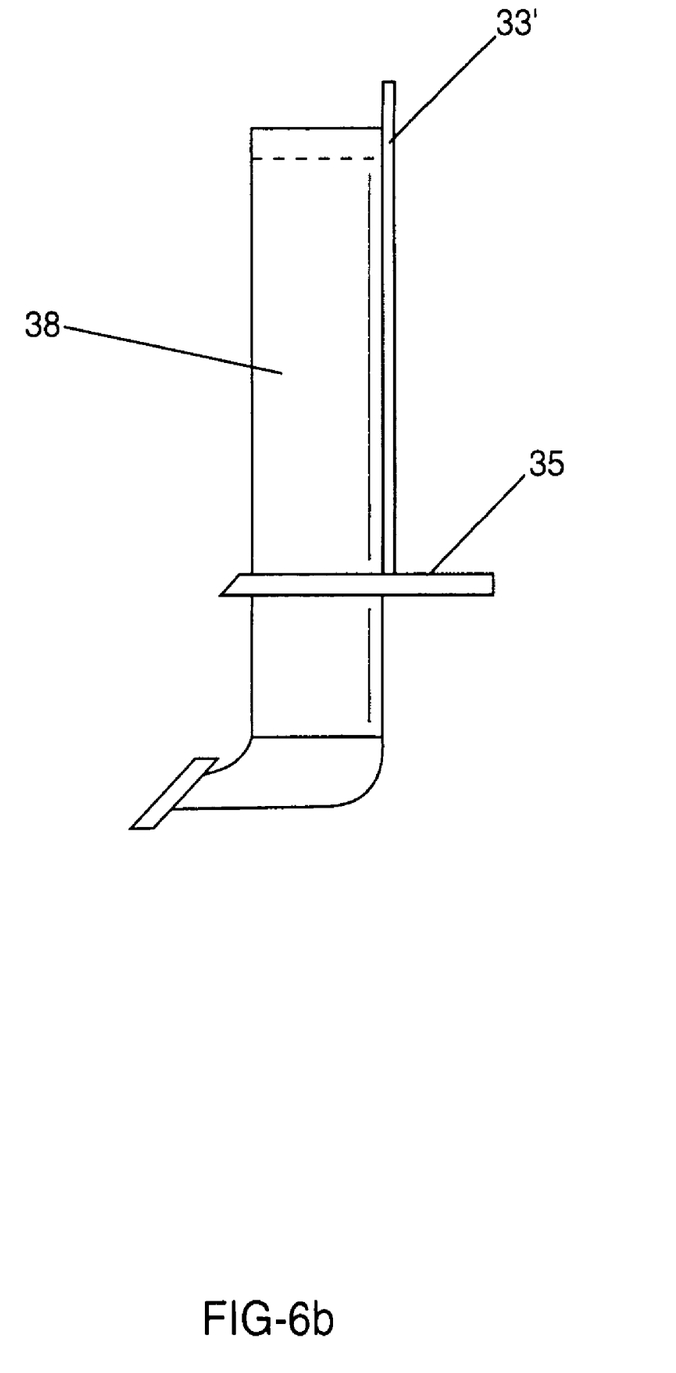
Figure 6C:
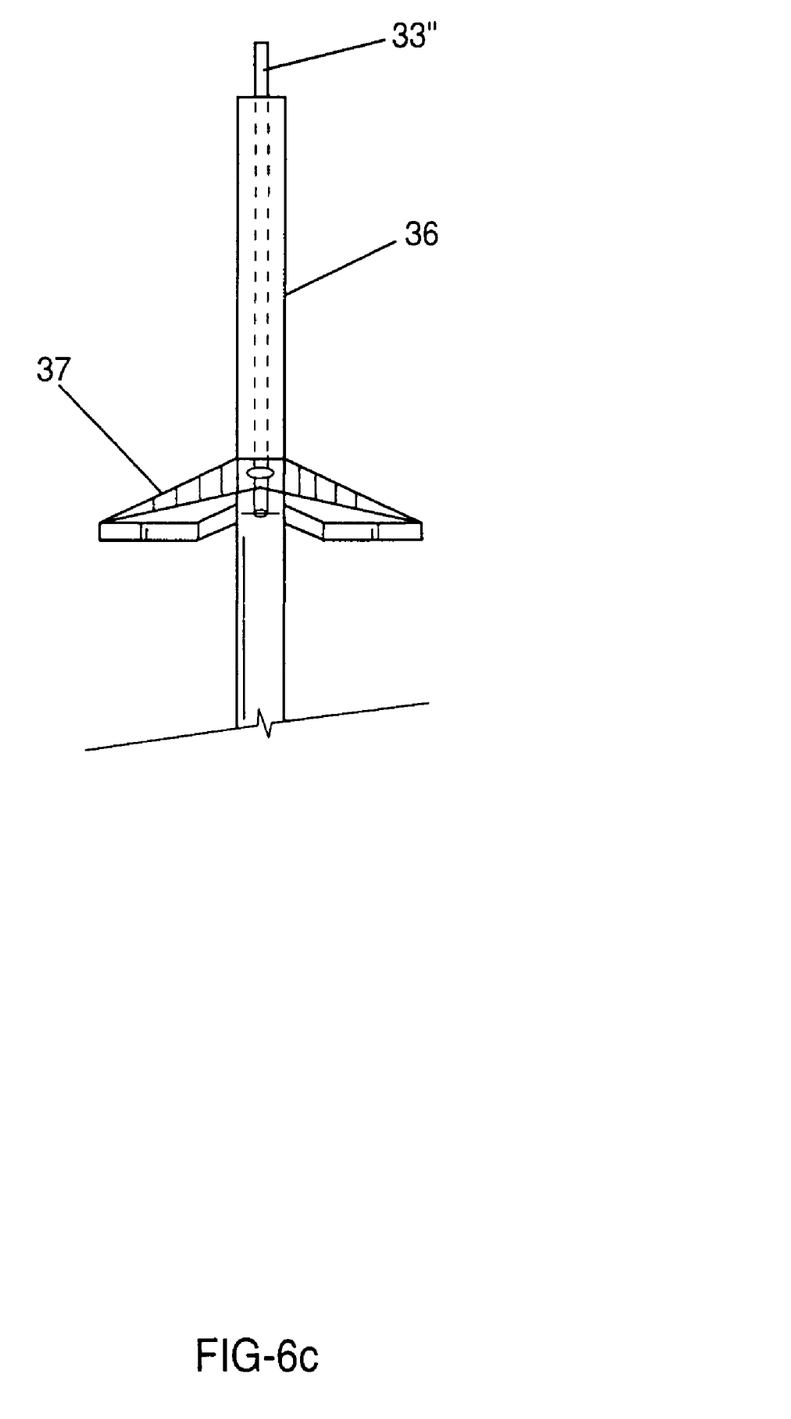

FIGS. 6a–6c show different shaped and types of shanks and blade attachments useful in accordance with the present invention. In FIG. 6a, supply line 33 is positioned on the rear of parabolic shank 31 with the spray blade attachment 34 of the present invention. Supply line 33 feeds nozzles 39. Straight shank 38 and the blade attachment 35 of the present invention are shown in FIG. 6b, with supply line 33'. FIG. 6c shows a beet shear shank 36 with blade attachment 37 of the present invention, with supply line 33' going down the rear of shank 36. These shapes, along with the other shapes described herein, are only a few of the many possible shapes of shanks and blades useful in accordance with the present invention.

The present invention is designed for use with dyed water when adjusting nozzle placement and pressure and distribution of solution as it is being drawn through different soil types. Alternative embodiments of the present invention include using gauge wheels and laser control for adjustments.

The present invention has been proven to be particularly effective for the eradication of Salt Cedar (Tamarix), a harmful dense brushy plant that has invaded and taken over many riparian ecosystems. The preferred active ingredient of the herbicide for use on Salt Cedar with the present invention is 2,4-Dichlorophenoxyacetic acid, Dimethylamine salt ("2,4-D"), 38.9% by weight or 3.8 lbs. per gallon, Isomer specific by AOAC method No. 978.05. 2,4-D, including mixtures, salts, and esters, is applied at rates of 0.003125% to 0.05%. This is a rate of application based on material placed in 25 gallons of carrier (water) applied per acre. 2,4-D is not generally recommended for eradicating Salt Cedar, but has been found to be very effective when used with the present invention.

The following chemicals are alternative herbicides for use with the present invention. These examples are for illustrative purposes only and are not intended to limit the scope of the invention.

Aquatic Sites

Accord
Arsenal Applicators Concentrate
Barrage HF
Opti-Amine
Rodeo
Savage
Weedar 64
Weedar IVM 44

Aquatic Sites, Edges and Dry Bottoms

Diquat
Roundup Custom
Roundup EZ DRY
Roundup Original
Roundup Original RT
Roundup Ultra
Savage Canals/Ditches Aquathol K
Copper-Z 4/4
Diquat
Direx 80DF
Hydrothol 191
Karmex DF
Landmaster BW
Opti-Amine
Rattler
Rodeo
Roundup Custom
Roundup EZ DRY
Roundup Original
Roundup Original RT
Roundup Ultra
Roundup Ultra RT
Savage
Weedar 64
Weedar IVM 44

Catch Basins

VectoBac 12AS
VectoBac G

Ditchbanks

Amine 4 2,4-D
Ansar 6.6
Ansar 8100
Arsenal
Arsenal Applicators Concentrate
Arsenal Railroad
Arsonate Liquid
Banvel
Barrage HF
Bueno 6
Clarity
Crossbow
Daconate 6
Daconate Super
Ded-Weed Sulv
Opti-Amine
Phenoxy 088
Rattler
Remedy
Roundup EZ DRY
Roundup Ultra
Saber
Sahara DG
Savage
Solicam DF
Stalker
Weedar 64
Weedar IVM 44
Weedone 638
Weedone LV4 Solventless Lakes/Ponds Aquathol K
Aquathol Super K
Arsenal Applicators Concentrate
Barrage HF
Copper-Z 4/4
Diquat
Hydrothol 191
Opti-Amine
Rodeo
Savage
Weedar 64
Weedar IVM 44

Marshes/Marshy Areas

Arsenal Applicators Concentrate
Opti-Amine
Savage
Weedar 64
Weedar IVM 44

Pools, Temporary

Arsenal Applicators Concentrate
VectoBac 12AS
VectoBac G

Water, Nonflowing

Aquathol K
Aquathol Super K
Arsenal Applicators Concentrate
Barrage HF

-continued

Copper-Z 4/4
Diquat
Hydrothol 191
Opti-Amine
Rodeo
Savage
Weedar 64
Weedar IVM 44

Manufacturers' specifications and labels should determine application rates of the alternative herbicides.

The method and apparatus of the present invention are effective, for example, on the following types of plant life. These examples are for illustrative purposes only and are not intended to limit the scope of the invention.

BRUSH SPECIES

| Common Name | Species |
| --- | --- |
| American beech | *Fagus grandifolia* |
| Ash | *Fraxinus* spp. |
| Bald cypress | *Taxodium distichum* |
| Bigleaf Maple | *Acer macrophylum* |
| Black Locust | *Robinia pseudoacacia* |
| Blackgum | *Nyssa sylvatica* |
| Boxelder | *Acer negundo* |
| Brazilian peppertree | *Schinus terebinthifolius* |
| Camelthorn | |
| Cherry | *Prunas* spp. |
| Chinaberry | *Melia azadarach* |
| Chinese tallow-tree | *Sapium sebiferum* |
| Cottonwood | |
| Dogwood | *Cornus* spp. |
| Elm | *Ulmus* spp. |
| Hawthorn | *Crataegus* spp. |
| Hickory | *Carya* spp. |
| Honeylocust | *Gleditsia triacanthos* |
| Maple | *Acer* spp. |
| Melaleuca | *Melaleuca quiquenervia* |
| Mesquite | |
| Mulberry | *Morus* spp. |
| Oak | *Quercus* spp. |
| Pepperweed (perennial) | |
| Persimmon | *Diospyros virginiana* |
| Pine | *Pinus* spp. |
| Poplar | *Populus* spp. |
| Privet | *Ligustrum vulgare* |
| Red Alder | *Alnus rubra* |
| Red Maple | *Acer rubrum* |
| Russian Olive | *Elaeagnus angustifolia* |
| Saltcedar | *Tamarix ramosissima* |
| Sassafras | *Sassafras albidum* |
| Sourwood | *Oxydendrum arboreum* |
| Sumac | *Rhus* spp. |
| Sweetgum | *Liquidambar styraciflua* |
| Willow | *Salix* supp. |
| Wolf berry | |
| Yellow poplar | *Liriodendron tulipifera* |

The present invention may be pushed or pulled by any device or vehicle, such as agricultural tractors, tracked tractors (bulldozers), rubber tracked-type dozers, backhoes, and excavators, operating on the surface. The surface may be any land that is dry or covered with water. The surface should first be cleared of the dense growth of the target plants, leaving the plants' roots, but little of their above-ground growth. The shank may be adjusted to position the cutting blade at the desired depth, usually the depth of the root zone of the target plants. Because most dense tree and brush species have root zones at least 12 inches below the surface, the present invention is able to eradicate these species while prior art devices cannot. Preferred depths, using the present invention, are 12–8 inches, but even lower depths (e.g., many feet) can be achieved by using heavier duty equipment. As the cutting blade is moved forward through the soil, it shears the roots of target plants while leaving shallower root zones undisturbed. Spray nozzles apply herbicide directly to the roots as they are cut.

The method of the present invention results in a tremendous cost and time savings, particularly, in the plant eradication process. This method is a more selective management tool in that only the undesirable plants are eradicated. Being able to control depth of application and targeting different root zones is a very positive aspect of the present invention. Using currently available methods with a non-selective herbicide above ground, many species of desirable vegetation may be destroyed, and the ecosystem may become polluted by toxic chemicals. By going underground with the present invention and applying, in some cases, the same herbicide to a root zone, mortality of desirable vegetation can be greatly reduced. Also, toxic pollution is minimized because less herbicide is required since it is placed exactly where it is needed, and it is placed directly into the soil below ground instead of being sprayed from the air.

The present invention is useful particularly for, but not limited to, woody brush and dense tree species. The present invention is useful on aquatic sites, aquatic site edges and dry bottoms, rivers, canals and ditches, catch basins, ditch banks, lakes and ponds, marshes/marshy areas, pools, and temporary non-flowing water.

The present invention is more effective than currently used methods because the roots of the unwanted plants are severed, and herbicide is applied directly to the roots. The present invention is almost immediately effective, whereas some currently used methods may require years. The present invention is far less costly than many currently used methods for several reasons. First, no aerial spraying is required. Second, because the herbicides are applied directly to the roots, a greatly reduced volume of herbicide is required to treat the same area. Third, because the present invention uses a reduced volume of herbicide and because the herbicide is applied deep in the soil, the desirable shallow-rooted plants are not affected, resulting in decreased reclamation costs.

Safety benefits of below-ground application of herbicides as used in the present invention are as follows:
1) Herbicides and/or pesticides do not drift in the soil to contaminate surrounding areas;
2) Little to no exposure to humans and animals during active life of chemicals (Workmen Protection Standard Act reentry periods);
3) Less exposure to person or persons while applying; and
4) Reduced potential for accidental exposure.

Although the discussion above has been primarily directed to the eradication of plants using herbicides, the apparatus and method of the present invention are applicable to any application of fluid to plants or soil. For instance, it may be desired to apply fertilizer or soil additives to the ground. Likewise, it may be desirable to sterilize soil using a toxic substance. The fluid used may be a liquid or gas.

EXAMPLE

The following is a description of how to calibrate the equipment of the present invention. Determine the speed that the bar will be traveling in the field in feet per minute. Equipment speedometers are seldom accurate enough, so a distance must be measured and travel accurately timed in seconds. This should be done under typical field conditions, as slippage of the tires in loose or wet soil will result in slower speeds than on a paved or packed surface.

Multiply the bar speed by the nozzle spacing to determine the area sprayed per minute by each nozzle.

$$\text{speed} = \frac{\text{distance (feet)}}{\text{time (sec)}} \times \frac{60 \text{ sec}}{\text{min}}$$

$$\text{area} \frac{\text{acres}}{\text{minute}} = \text{speed} \frac{\text{feet}}{\text{minute}} \times \text{nozzlespacing (inches)} \times \frac{1 \text{ foot}}{12 \text{ inches}} \times \frac{1 \text{ acre}}{43{,}560 \text{ sq ft}}$$

Collect the spray output from each nozzle for a set period of time (some fraction of a minute), and determine the average volume per nozzle per minute. Consider replacing individual nozzles that vary more than 5% from the average of all nozzles.

$$\text{output} \frac{\text{gal}}{\text{minute}} = \frac{\text{volume (fl oz)}}{\text{time (sec)}} \times \frac{60 \text{ sec}}{\text{min}} \times \frac{1 \text{ gal}}{128 \text{ fl oz}}$$

$$\text{output} \frac{\text{gal}}{\text{minute}} = \frac{\text{volume (ml)}}{\text{time (sec)}} \times \frac{60 \text{ sec}}{\text{min}} \times \frac{1 \text{ gal}}{3785 \text{ ml}}$$

Then divide the average nozzle output by the area sprayed to determine gallons per acre.

$$\frac{\text{gal}}{\text{acre}} = \frac{\text{gal}}{\text{minute}} \div \frac{\text{acre}}{\text{minute}}$$

So long as nozzles are evenly spaced and output of each is reasonably close to the average, these formulas will work for applications regardless of the bar width or number of nozzles on the bar.

If the calibrated bar puts out 37 gal/acre and 4 lb of pesticide product per acre needs to be applied, add 4 lb of product to the spray tank for every 37 gal of water that it contains.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for cutting plants and cutting through soil and for applying fluids to plants or soil, said apparatus comprising:

at least two spaced-apart shanks;
   a root cutting blade member, said blade member disposed at an end of each said shank, sufficient for cutting roots, at approximately 12 inches or more below ground level, of dense tree and woody brush plant species having root zones of at least approximately 12 inches below ground surface while allowing shallow-rooted native plants located above the roots to survive and cutting through soil to a depth of at least 12 inches;
   at least one nozzle;
   a fluid supply source; and
   a line connecting said fluid supply source to said nozzle, said nozzle system releasing the fluid during operation of said blade member.

2. The apparatus of claim 1 further comprising a coulter disposed forward of each said shank.

3. The apparatus of claim 1 wherein said at least one nozzle comprises at least one nozzle disposed within said blade member.

4. The apparatus of claim 1 wherein said at least one nozzle is disposed in a forward direction of said blade direction of travel.

5. The apparatus of claim 1 wherein said at least one nozzle is disposed in a rearward direction of said blade direction of travel.

6. The apparatus of claim 1 further comprising at least one shield disposed near said nozzle for protecting said nozzle.

7. The apparatus of claim 1 wherein said blade member comprises at least one chisel point.

8. An apparatus for cutting plants and cutting through soil and applying fluid to plants or soil, said apparatus comprising:

at least two spaced-apart shanks;
   a root cutting blade member disposed at an end of each said shank and comprising a cutting edge sufficient for cutting roots of dense tree and woody brush plant species having root zones of at least approximately 12 inches below ground surface while allowing shallow-rooted native plants located above the roots to survive;
   at least one nozzle disposed in a forward direction of said cutting edge;
   a fluid supply source; and
   a line connecting said fluid supply source to said nozzle, said nozzle releasing the fluid during operation of said blade member.

9. The apparatus of claim 8 wherein said nozzle is recessed within said blade member.

10. The apparatus of claim 8 further comprising at lease one shield disposed near said nozzle system for protecting said nozzle.

11. The apparatus of claim 8 further comprising a sensor and control system.

* * * * *